J. DEVINEZ.
HEADLIGHT FOR AUTOMOBILES.
APPLICATION FILED AUG. 10, 1916.
1,212,460.
Patented Jan. 16, 1917.
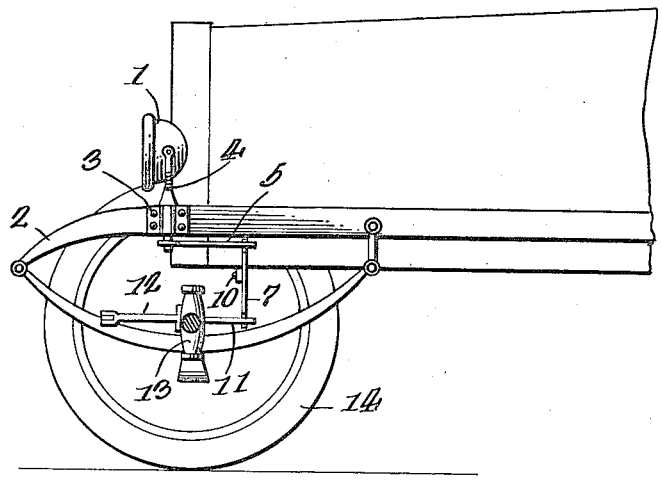
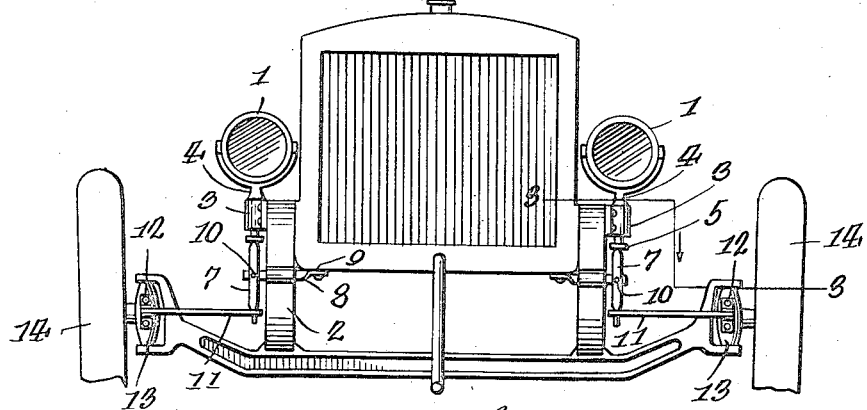
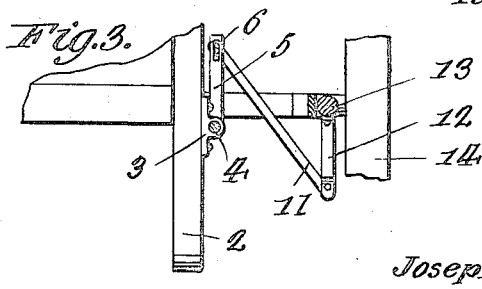
INVENTOR
Joseph Devinez
WITNESSES
Guy M. Spring
Wm. S. Fowler
BY Richard Bowen.
ATTORNEY

UNITED STATES PATENT OFFICE.

JOSEPH DEVINEZ, OF LOWELL, MASSACHUSETTS.

HEADLIGHT FOR AUTOMOBILES.

1,212,460. Specification of Letters Patent. Patented Jan. 16, 1917.

Application filed August 10, 1916. Serial No. 114,262.

*To all whom it may concern:*

Be it known that I, JOSEPH DEVINEZ, a citizen of the United States, residing at Lowell, in the county of Middlesex and State of Massachusetts, have invented certain new and useful Improvements in Headlights for Automobiles, of which the following is a specification.

This invention relates to certain new and useful improvements in head-lights for automobiles or other vehicles and more particularly to dirigible head-lights.

An object of the invention resides in the provision of a dirigible head-light which will be of such form that it may be readily applied to vehicles of different characters and connected with the steering knuckles of the front wheels regardless of the location of the lamps upon the springs.

Another object of the invention resides in the provision of a simple connection between the lamps and the steering knuckles.

For a further object the invention contemplates the provision of a dirigible headlight which will be composed of the minimum number of parts, inexpensive and highly efficient in use.

With these general objects in view and others that will appear as the nature of the invention is better understood, the same consists in the novel combination and arrangement of parts hereinafter more fully described, illustrated in the accompanying drawings, and pointed out in the appended claim.

In the drawings forming a part of this application and in which like designating characters refer to corresponding parts throughout the several views:—Figure 1, is a side elevation of a portion of a vehicle with my invention applied thereto. Fig. 2, is a front elevation of the same, and Fig. 3, is a detail section on the plane of line 3—3 of Fig. 2.

Referring more specifically to the drawings, 1 designates the lamps which are mounted upon the front springs 2 in a suitable manner, as shown at 3, said lamps being supported in the forked upper ends of the supporting rods 4.

Secured to the lower ends of the rods 4, are the rods 5 which have their rearwardly directed free ends provided with elongated slots 6, within which are engaged the reduced upper ends of the vertical rods 7.

The bracket plates 8 serve to support the vertical rods 7, said plates 8 having their inner ends turned and secured to the frame work or other stationary portion of the vehicle as shown at 9. The other ends of the plates 8 carry the pivot pins 10 which are engaged through the central portions of the vertical rods 7.

Loosely mounted upon the reduced lower ends of the vertical rods 7, are the rear ends of the horizontal rods 11, which are also connected with the forward ends of the operating rods 12, connected in a suitable manner by their rear ends to the steering knuckles 13 of the front wheels 14.

From the foregoing, it will be evident that turning of the front wheels 14 will cause operation of the rods 12 and 11 to swing the rods 7 upon their pivot pins 10, thereby swinging the rods 5 and turning the supporting rods with the lamps 1 to direct the rays of light in the direction in which the vehicle is being turned. It will be understood that if desired, the positions of the different rods may be altered and a cross rod or other connection may be provided between the lamps with a single connection between one of the lamps and one of the steering knuckles.

It will be evident that many minor changes in the details of construction and arrangements of parts may be resorted to within the scope of the appended claim without departing from the spirit of the invention.

What I claim as new is:—

A head light operating mechanism comprising a rotatable lamp supporting member, a rearwardly directed rod carried by said member, said rod being slotted longitudinally, a vertical member pivoted to a stationary support and having a reduced end engaged in the slot of said rod, a steering knuckle, an operating rod carried by said steering knuckle, and connections between said operating rod and said vertical member to swing the latter within said slot and cause rotation of said lamp supporting member upon operation of said steering knuckle.

In testimony whereof I affix my signature in presence of two witnesses.

JOSEPH DEVINEZ.

Witnesses:
ANNA L. DUNN,
HENRY B. RUITER.